United States Patent
Hwa

(10) Patent No.: US 9,950,736 B2
(45) Date of Patent: Apr. 24, 2018

(54) CHARACTERIZATION OF STICK-SLIP CONDITION IN A STEERING SYSTEM

(71) Applicant: GM GLOBAL TECHNOLOGY OPERATIONS LLC, Detroit, MI (US)

(72) Inventor: Ian Y. Hwa, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 348 days.

(21) Appl. No.: 14/734,196

(22) Filed: Jun. 9, 2015

(65) Prior Publication Data

US 2016/0362130 A1 Dec. 15, 2016

(51) Int. Cl.
*B62D 5/04* (2006.01)
*B62D 6/00* (2006.01)

(52) U.S. Cl.
CPC ......... *B62D 5/0481* (2013.01); *B62D 5/0409* (2013.01); *B62D 5/0421* (2013.01); *B62D 5/0457* (2013.01); *B62D 5/0463* (2013.01); *B62D 6/00* (2013.01)

(58) Field of Classification Search
None
See application file for complete search history.

(56) References Cited

U.S. PATENT DOCUMENTS

| | | | | |
|---|---|---|---|---|
| 5,402,341 A | * | 3/1995 | Liubakka | B62D 7/159 180/412 |
| 6,370,459 B1 | * | 4/2002 | Phillips | B62D 5/0436 180/443 |
| 7,684,401 B2 | * | 3/2010 | Dropps | H04L 49/10 370/392 |
| 7,742,899 B2 | | 6/2010 | Lemont, Jr. et al. | |
| 2012/0239254 A1 | * | 9/2012 | Heilig | B62D 5/0481 701/41 |

* cited by examiner

*Primary Examiner* — Ryan Rink
*Assistant Examiner* — Paul A Castro
(74) *Attorney, Agent, or Firm* — Quinn IP Law

(57) ABSTRACT

A method for characterizing a stick-slip condition in a steering system includes transmitting a periodic steering control signal to a rotary actuator to cause rotation of a steering shaft, through a torsion bar and inertia wheel, over a range of steering angles, and applying an axial force to a rack to resist rack displacement from a centered position. A steering torque output value is measured via a torque transducer. A control action is executed when a measured difference between a maximum value of a steering torque required to initiate rack motion/torque breakaway and a minimum value of the steering torque after breakaway for start-up or subsequent steering reversal exceeds a calibrated threshold. A system includes the rotary actuator, steering system, torque transducer, torsion bar, inertia wheel, linear actuator(s) providing an axial force along the rack axis to resist rack displacement from a centered position, and controller programmed as noted above.

12 Claims, 2 Drawing Sheets

CHARACTERIZATION OF STICK-SLIP CONDITION IN A STEERING SYSTEM

TECHNICAL FIELD

The present disclosure relates to the characterization of a stick-slip condition in a steering system.

BACKGROUND

Vehicular rack and pinion steering systems include an elongated flat gear or rack having teeth which mesh with mating teeth of a rotating pinion gear. The pinion gear is rotatably mounted on a steering shaft. As a steering angle is imparted to the steering shaft via rotation of a steering wheel, the pinion gear translates along the rack via engagement with the rack teeth. This in turn moves the rack in a corresponding steering direction. Tie rods, which are disposed at the distal ends of the rack, are connected to front road wheels of a vehicle via a corresponding steering arm. Therefore, rack and pinion steering systems effectively convert rotational motion with respect to a steering axis into linear motion with respect to the rack, while also providing a suitable level of gear reduction.

Steering functionality provided by typical rack and pinion steering systems may be electrically assisted in some designs. For instance, an electric steering motor may be controlled to impart a variable steering torque overlay via a drive mechanism to the rack itself, i.e., a rack electric power steering (EPS) system, or along the steering axis in a pinion EPS or a column EPS system. While EPS systems of all types generally perform well under most driving conditions, a transient phenomenon involving a sudden increase in required steering effort followed by an abrupt reduction in steering resistance may manifest itself under certain driving conditions. Such a condition, referred to herein as a stick-slip condition, can impact steering quality and overall drive feel.

SUMMARY

A method and system are disclosed herein for characterizing a stick-slip condition in an electrically-assisted vehicle steering system of the types described above, e.g., a column, pinion, or rack-type electric power steering (EPS) system. It is recognized herein that imperfections at or along surfaces of reduction gears or other mechanical interfaces can cause the stick-slip problem addressed herein. However, the transient and difficult-to-replicate nature of the stick-slip problem can lead to false diagnostic results. As a result, there is a need for an improved diagnostic test that can help isolate the stick-slip condition and facilitate corrective actions.

According to the present approach, the steering system is in communication with a controller that is programmed to execute steps of the present test method, and to thereby determine a stick-slip metric for correction of the stick-slip problem. In order to ensure proper functioning of the test, various hardware components are connected to the steering system. Specifically, a compliant torsion bar is connected between a rotary actuator and an inertia wheel along a steering axis such that any steering input provided from the rotary actuator is transmitted to the steering shaft via the torsion bar and inertia wheel. This configuration is intended to approximate a level of steering input compliance that will ordinarily be experienced in real-world driving situations.

The method proceeds by applying a periodic steering input control signal to the rotary actuator. The control signal causes the rotary actuator to rotate the steering shaft at a smooth and continuous rate. Linear actuators connected to respective ends of the rack apply an axial force proportional to a measured rack displacement, i.e., from a reference center rack position, and in the direction of resisting any rack motion. As the steering action occurs, steering output torque is measured along the steering axis via a torque transducer. Stick-slip of the steering system is then detected via comparison to a calibrated threshold value of a measured difference between a maximum value of a steering torque required to initiate rack motion, i.e., a breakaway steering torque, and a minimum value of the steering torque after occurrence of the maximum steering torque. This measurement and determination occurs at start-up of the test and at each subsequent steering direction reversal as set forth herein. Control actions can thereafter be taken to correct the stick-slip problem, for instance in the design and validation stages of manufacturing, whenever the calibrated threshold value is exceeded.

In a particular embodiment, a method for characterizing a stick-slip condition in a steering system includes connecting a torsion bar and an inertia wheel to the steering shaft. The method also includes transmitting a periodic steering control signal from a controller to a rotary actuator to cause rotation of the steering shaft, via the torsion bar and inertia wheel, through a calibrated range of steering angles. Additionally, the method includes measuring rack displacement from a reference center rack position and applying an axial force to an end or ends of the rack via one or more linear actuators. The applied axial force is proportional to the measured rack displacement and is in a direction resisting rack motion.

The method in this embodiment also includes measuring a steering torque output value via a torque transducer or other suitable sensor. A control action may be executed with respect to the steering system whenever a difference between a maximum value of a measured steering torque required for initiating rack motion, i.e., breakaway steering torque, and a minimum value of the measured steering torque after such breakaway, for start-up and each subsequent steering reversal, exceeds a calibrated threshold indicative of the stick-slip condition.

An associated system includes the rotary actuator, steering system, and torque transducer noted above, as well as a torsion bar and inertia wheel connected to the rotary actuator via the steering shaft, the linear actuator, and the controller.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
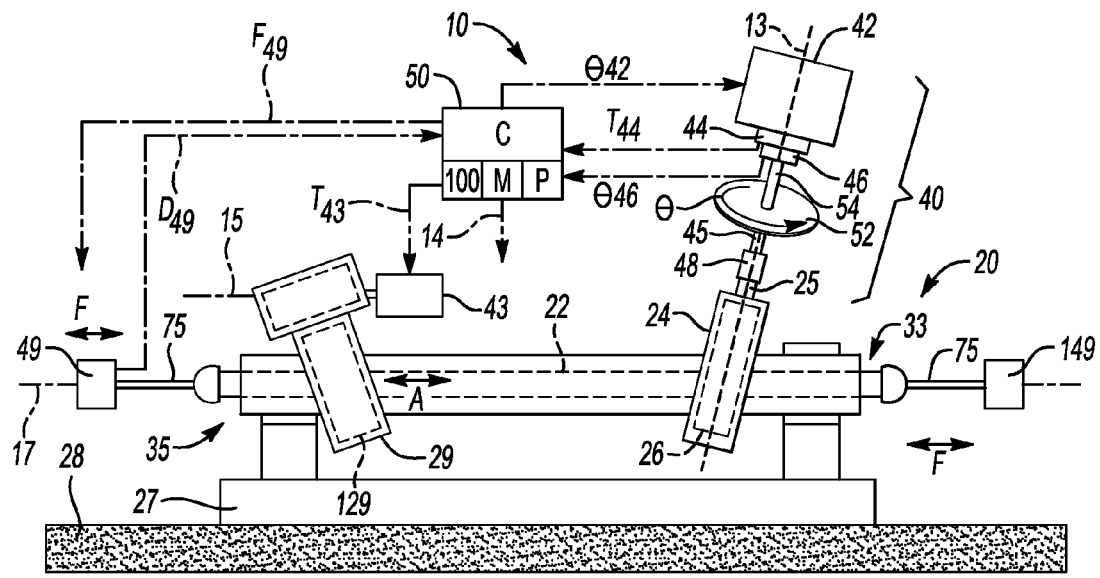
FIG. 1 is a schematic depiction of an example test system for characterizing a steering gear stick-slip condition in a vehicle steering system as described herein.

Referring to the drawings, wherein like reference numbers refer to like components throughout the several views, an example steering test system 10 is shown schematically in FIG. 1. The test system 10 includes a steering system 20 of the types noted above, as well as steering control hardware 40 and a controller (C) 50 programmed to execute logic embodying a test method 100 using the control hardware 40. Execution of the method 100 results in characterization of a steering stick-slip condition in the steering system 20 as described in further detail below with reference to FIGS. 2A-3.

The steering system 20 may be embodied as an electrically-assisted steering system of the types well known in the art, for instance a dual-pinion electric power steering (EPS) as shown, or alternatively a pinion EPS system or a column EPS system. As such, the steering system 20 of FIG. 1 includes an elongated toothed rack 22 having a rack axis 17, a first end 33, and a second end 35. The steering system 20 also includes a gear housing 24 and a steering shaft 25, with the gear housing 24 positioned proximate the first end 33 of rack 22. The steering system 20 may also include a steering assist motor 43 and a drive mechanism 129 within a drive housing 29.

Depending on the EPS system embodiment, the drive mechanism 129 and drive housing 29 may be positioned proximate the second end 35 of the rack 22 as shown, which is typical of a dual-pinion rack EPS system. A rotor axis 15 of the steering assist motor 43 is oriented to enable electrical assist of the steering operation, e.g., through the drive mechanism 129, which may be embodied as suitable gearing, chains, belts, and/or another speed reduction mechanism in such an example embodiment. Although omitted from FIG. 1 for illustrative simplicity, the steering assist motor 43 and drive mechanism structure similar to the drive mechanism 129 and drive housing 29 may be alternatively positioned on or along the steering axis 13 so as to form a column or a pinion EPS system as noted above. A column EPS embodiment may also include a steering column and an intermediate shaft, as is known in the art, with the steering assist motor 43 delivering steering assist torque to a separate drive mechanism mounted adjacent the steering column. A pinion EPS system, by way of contrast, may place the steering assist motor 43 adjacent to the gear housing 24 such that an assist torque acts directly on the rotatable pinion gear 26. Regardless of the embodiment, a fixture 27 and a base plate 28 may be used to secure the steering system 20 within a test environment.

The gear housing 24 located at the first end 33 of the rack 22 contains a rotatable pinion gear 26. As a steering input in the form of a commanded steering angle is imparted to the steering shaft 25 about the steering axis 13, typically from a steering wheel (not shown) but via a rotary actuator 42 in the present controlled test environment, the pinion gear 26 within the gear housing 24 engages mating gears (not shown) of the rack 22. The pinion gear 26 thus translates along the rack axis 17 as indicated by double-headed arrow A. This motion in turn moves the rack 22 in a corresponding direction to steer the front wheels of a vehicle (not shown) within which the steering system 20 is used.

It is recognized herein as a basis for conducting the present method 100 that a steering stick-slip condition can result from imperfections in the various mechanical interfaces of the steering system 20, e.g., mating worm gears or other type of gears within a drive mechanism 129 of drive housing 29 and the rack 22, when a vehicle equipped with the steering system 20 is in operation. The stick-slip condition is sporadic and transient, and is thus difficult to replicate in a test environment. The method 100 thus takes steps to replicate real world driving conditions in a controlled test environment for the purpose of isolating and correcting the steering stick-slip problem described above.

The control hardware 40 of FIG. 1 is therefore configured to help solve this problem when used in conjunction with the controller 50 described below. The control hardware 40 includes the rotary actuator 42 such as an electric motor, as well as a torque transducer 44 and a rotary encoder 46, each of which is coaxially aligned with each other along the steering axis 13. It should be noted that the use of a torque transducer 44 coupled to the rotary actuator is merely exemplary. In this regard, the torque transducer 44 can comprise any suitable device for measuring and observing a torque on the steering shaft 25 of the steering system 20, including, but not limited to, an internal torque sensor associated with the steering system 20. Because axial variation may be present in the components of the control hardware 40, an extension shaft 45 may be coupled to the steering shaft 25 via a set of flexible couplings 48 as shown. The flexible couplings 48 are intended to facilitate connection of the rotary actuator 42 to the steering shaft 25.

Also used as part of the control hardware 40 are a compliant torsion bar 54 and an inertia wheel 52, both of which are arranged on the steering axis 13 as shown. Together, the torsion bar 54 and inertia wheel 52 are intended to simulate how the steering system 20 is set up in a typical vehicle, i.e., with a steering column and intermediate shaft, couplings, and the like ultimately linking a steering wheel to the pinion gear 26. The materials of construction and resilience/inertia provided by the torsion bar 54 and the inertia wheel 52 may vary with the design of the steering system 20, and are intended to simulate the stiffness and inertia characteristics of portions of the steering system above the level of the steering gear itself. In an example configuration, the torsion bar 54 may provide a torsional rate of about 0.3 to 0.5 Nm/degree and the inertia wheel 52 has a moment of inertia of about 0.03 to 0.05 kg-m$^2$, or 0.4 Nm/degree and 0.04 kg-m$^2$ in another configuration.

Still referring to FIG. 1, a linear actuator 49 is disposed at second end 35 of the rack 22 and connected to one of a pair of tie rods 75. A substantially identical linear actuator 149 may be optionally placed at the first end 33 as shown. The controller 50 is placed in wired or wireless communication with each of the linear actuator 49 and/or 149, the rotary actuator 42, the torque transducer 44, and the rotary encoder 46, such that the controller 50 receives a measured rack displacement (arrow $D_{49}$) as a linear actuator position signal and transmits and receives axial force control signals (arrow $F_{49}$) to and from the linear actuator 49 and/or 149.

That is, the controller 50 commands application of a variable axial force along the rack axis 17 that is proportional to actuator or rack displacement from a reference center rack position, i.e., a position in which the rack 22 is centered, and monitors the rate and level of the applied axial force. The controller 50 also receives a measured steering output torque (arrow $T_{44}$) about the steering axis 13 from the torque transducer 44 and a measured steering angle signal ($\theta_{46}$) from the rotary encoder 46, as well as transmits the steering angle signal (arrow $\theta_{42}$) to the rotary actuator 42 to control the rotational output of the rotary actuator 42. Thus, the controller 50 commands the rotary actuator 42 to apply a calibrated steering angle or torque to steering system while the linear actuator(s) exert a load on the rack 22. An integrated ECU (not shown) of the steering assist motor 43 then determines and controls the amount of torque overlay the assist motor 43 should generate, for instance based on an input torque signal from an internal torque sensor (not shown) located along the steering axis 13 and a variety of other signals such as vehicle speed, ignition state, etc., as is well known in the art. Thus, electric power and steering control signals (arrow $T_{43}$) are provided to the steering assist motor 43 so as to enable the steering assist motor 43 to output a preprogrammed assist torque.

Figure 3:
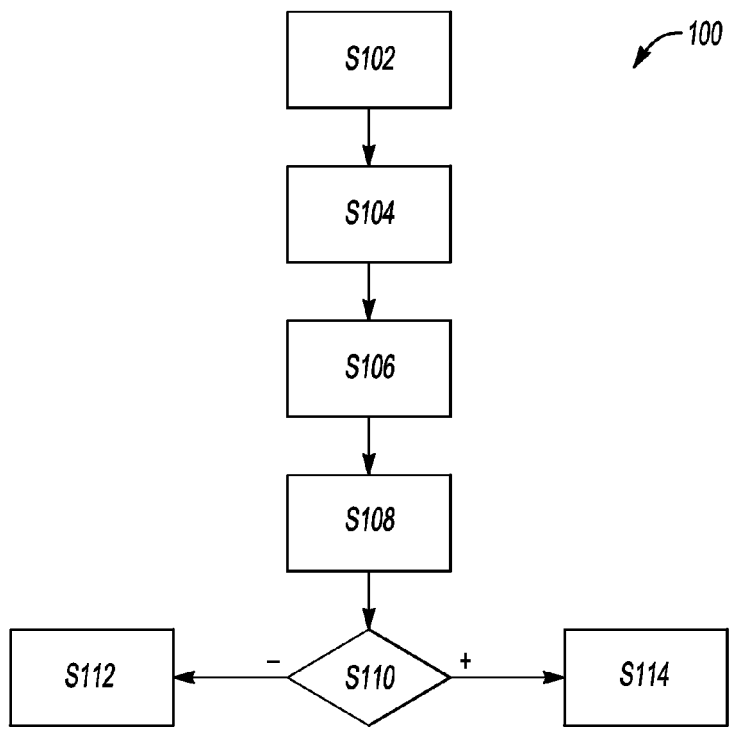
FIG. 3 is a flow chart describing an example method for characterizing a steering stick-slip condition in a steering system using the test system shown in FIG. 1.

The controller 50 of FIG. 1 may be configured as a host machine, e.g., a digital computer or microcomputer, that is specially programmed to execute steps of the method 100, an example of which is shown in FIG. 3. To that end, the controller 50 is configured with sufficient hardware to perform the required steps, i.e., with sufficient memory (M), a processor (P), and other hardware such as a high-speed clock, analog-to-digital and/or digital-to-analog circuitry, a timer, input/output circuitry and associated devices, signal conditioning and/or signal buffering circuitry. The memory (M) includes sufficient tangible, non-transitory memory such as magnetic or optical read-only memory, flash memory, etc., as well as random access memory, electrically erasable programmable read only memory, and the like.

Figure 2A:
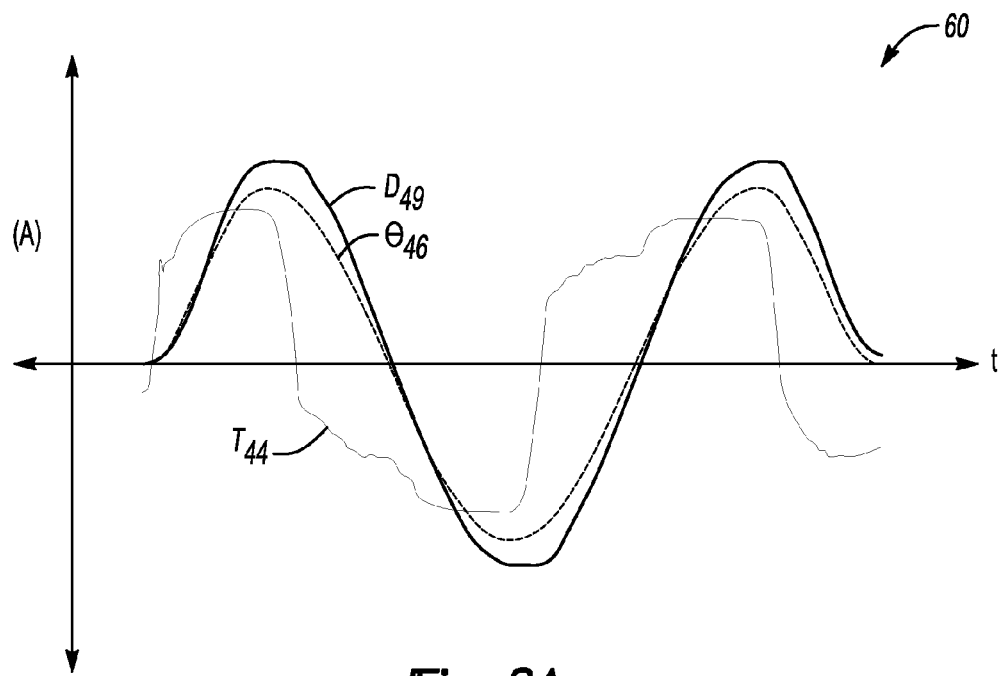
FIGS. 2A and 2B are representative time plots of respective satisfactorily and unsatisfactorily performing steering systems, with measured steering output torque, rack displacement, and steering angle plotted on the vertical axis and time plotted on the horizontal axis.
Figure 2B:
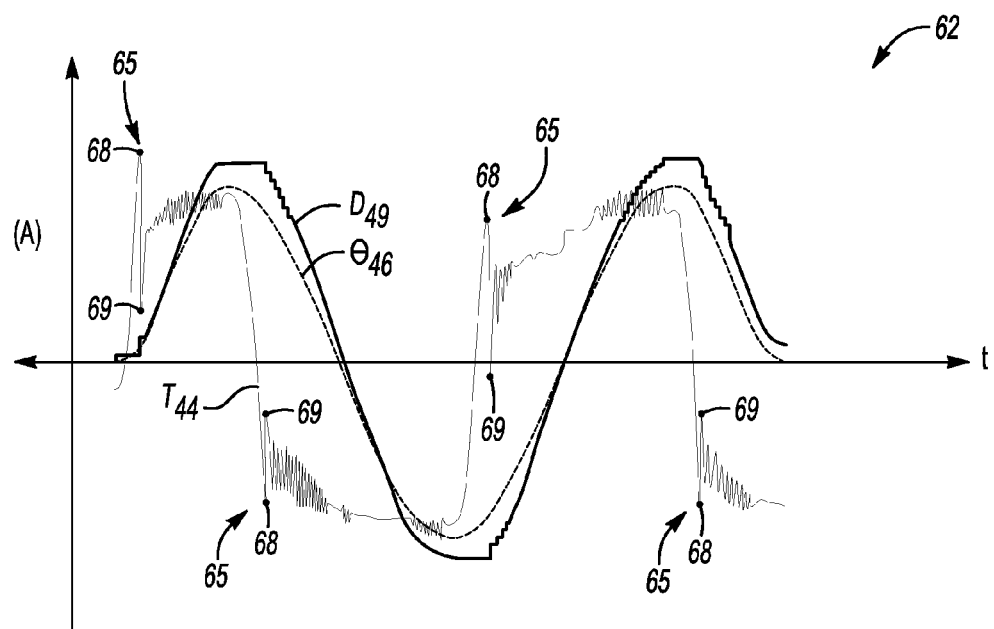

Example traces 60 and 62 are shown in FIGS. 2A and 2B, respectively, to illustrate time plots of example acceptable and unacceptable test scenarios. Trace $D_{49}$ represents the measured axial displacement of the rack 22 from the linear actuator 49, for instance in millimeters (mm), while trace $\theta_{46}$ represents the steering angle imparted to the steering axis 13. Trace $T_{44}$ represents the steering output torque measured via the torque transducer 44, with all hardware components shown in FIG. 1 and described above.

In FIG. 2A, i.e., the example acceptable response, note that the measured torque $T_{44}$ is relatively smooth. Without regard to the changing amplitude of such a signal, the depicted performance lacks significant torque spikes indicative of a stick-slip condition. The time plot of FIG. 2B by way of contrast illustrates an example unsatisfactory stick-slip performance. Arrows 65 indicate torque spikes from the stick-slip condition that can occur as interfacing mechanical components of the drive mechanism 129 or elsewhere in the steering system 20 are temporarily impinged before quickly releasing.

The torque spikes 65 can be used to evaluate against a calibrated threshold to diagnose and correct the stick-slip problem in a given steering system 20. For instance, a control action may be executed with respect to the steering system 20, via the controller 50, when a difference between an absolute maximum value of the measured steering torque required to initiate motion of the rack, indicated by points 68, and an absolute minimum value of the measured steering torque after torque breakaway (points 69) for start-up of the test and all subsequent steering reversals shown in the periodic steering control signal, i.e., trace $\theta_{42}$, exceed a calibrated threshold indicative of the stick-slip condition.

Referring to FIG. 3, an example embodiment of the method 100 for characterizing stick-slip in the steering system 20 of FIG. 1 begins with step S102, wherein the steering system 20 is connected to the control hardware 40 and placed in communication with the controller 50. In addition to connecting the controller 50 to the rotary actuator 42 and the torque transducer 44, step S102 includes connecting the linear actuator 49 and/or 149 of FIG. 1 to the rack 22 along the rack axis 17 and then placing the linear actuator 49 and/or 149 in communication with the controller 50. The method 100 proceeds to step S104 once the test system 10 has been constructed.

Optionally, adequate steering conditioning steps may be provided via transmission of a periodic conditioning signal via the controller 50 of FIG. 1 to, and resultant control of, the rotary actuator 42 through a rising conditioning phase, a sustained conditioning phase in which a peak calibrated steering angle is maintained, and a trailing conditioning phase. Such a periodic conditioning signal may be repeated a calibrated number of times. For instance, in a particular embodiment a duration of 1 second (1 s) can be used for each of the rising and trailing phases, with a duration of 2 s used for the sustained conditioning phase, with a corresponding steering angle of ±3° and calibrated frequency $f_{CAL}$ of about 8-12 Hz, or about 10 Hz in another embodiment. Eight cycles of the periodic conditioning signal may be used in this particular embodiment for a total of 32 s of steering conditioning. The actual values will vary with the type of test being performed and the particular components of the system being tested. Generally, conditioning for an insufficient amount of time or number of cycles may result in the problem not manifesting itself, while extended steering conditioning may not yield additional benefits.

At step S104, the controller 50 transmits the periodic steering control signal as to command the steering angle ($\theta_{42}$ of FIGS. 1-2B) via the rotary actuator 42 of FIG. 1. The periodic steering control signal may be a sine wave, e.g., with an amplitude of 10 degrees and frequency of 0.005 Hz, imparting a smooth steering start up. For instance, for an initial quarter cycle and final quarter cycle of a sine wave used for providing the steering angle input signal, a smooth start and end may be achieved by doubling the frequency and halving the amplitude of such an input signal. The method 100 proceeds to step S106 once the steering shaft 25 is rotating according to the periodic steering control signal.

Step S106 progresses in conjunction with step S104, and includes commanding a calibrated axial force along the rack axis 17 via the linear actuator 49 and/or 149 of FIG. 1, as indicated by double-headed arrow F in FIG. 1. The value of the axial apply force is proportional to the measured axial displacement of the rack 22 from the calibrated reference center rack position, for instance at 50 N/mm, and in a direction resisting such a displacement. That is, a "push/pull" action results with respect to the reference center position in a controlled operation of the linear actuator 49 and/or 149.

In a possible embodiment, the linear actuator 49 and/or 149 may include a linear variable differential transformer (LVDT), which as known in the art transforms linear motion into a corresponding electrical signal. An LVDT thus provides a rack displacement signal which can be used to compute the axial apply force as described above and allows the linear actuator 49 to act as a constant-rate spring. For improved performance, a dedicated displacement sensor may be used along axis 17 to determine the displacement of the rack 22, which is then communicated to the controller 50 for determination of the appropriate amount and direction of force (arrow F) to apply. The method 100 then proceeds to step S108.

At step S108, the torque transducer 44 measures the steering output torque ($T_{44}$) and communicates this measured value to the controller 50. The method 100 then proceeds to step S110.

Step S110 may include determining whether the test results from steps S102-S108 correspond to a passing/acceptable or failing/unacceptable steering system 20. In one example, the measured steering output torque ($T_{44}$) from step S108 is processed to compute a difference between the absolute maximum value of the measured steering torque required to initiate rack motion, i.e., points 68 of FIG. 2B, and a minimum value of the measured steering torque (points 69) occurring after "torque breakaway" from point 68 for start-up and each subsequent steering reversal. This difference is compared to a calibrated threshold value indicative of the stick-slip condition. Generally, if the calculated torque difference as described above is, e.g., 0.3 Nm or less, the stick-slip performance of the steering system 20 is considered to be acceptable. If the torque difference is above the calibrated limit, or 0.3 Nm in this example embodiment, then the stick-slip performance of the steering system 20 is deemed to be unacceptable. The method 100 proceeds to step S112 if, based on this comparison, the sample is unacceptable (−), and to step S114 in the alternative if the sample is acceptable (+).

Step S112 may include executing a control action with respect to the steering system 20 of FIG. 1 when the prior steps lead to a decision that the steering system 20 has an unacceptable performance. For instance, the controller 50 of FIG. 1 may record a first diagnostic code via an output signal, indicated via arrow 14 in FIG. 1, when the steering torque difference computed based on the measured steering output torque ($T_{44}$) exceeds the calibrated threshold value noted above with reference to step S108, i.e., a torque difference indicative of unacceptable stick-slip performance. Additional control steps may entail using the first diagnostic code to validate a given design of the steering system 20, such as by rejecting a given design in a design validation process when the diagnostic code is recorded or building a design specification.

Step S114 is reached when the steering torque difference computed based on the measured steering output torque ($T_{44}$) is at or below the calibrated threshold value, or in other words, when no perceptible stick-slip condition is detected in steps S102-S108. Step S114 may entail recording a second diagnostic code via the output signal (arrow 14) from the controller 50 when the steering torque difference computed based on the measured steering output torque ($T_{44}$) does not exceed the calibrated threshold value noted above with reference to step S110. As step S114 indicates a properly-functioning steering system 20, additional control steps may entail using the second diagnostic code to validate a given design of the steering system 20, such as by accepting a given design in a validation process or building a design specification.

As used herein with respect to any disclosed values or ranges, the term "about" indicates that the stated numerical value allows for slight imprecision, e.g., reasonably close to the value or nearly, such as ±10 percent of the stated values or ranges. If the imprecision provided by the term "about" is not otherwise understood in the art with this ordinary meaning, then "about" as used herein indicates at least variations that may arise from ordinary methods of measuring and using such parameters. In addition, disclosure of ranges includes disclosure of all values and further divided ranges within the entire range.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A method for characterizing a stick-slip condition in an electrically-assisted steering system having a rack, a pinion gear disposed on an end of a steering shaft in meshed engagement with the rack, a steering motor, and a drive mechanism that electrically assists a steering input into the steering system via the steering motor, the method comprising:
   connecting a torsion bar and an inertia wheel to the steering shaft;
   transmitting a periodic steering control signal from a controller to a rotary actuator, while the steering motor and the drive mechanism assist the steering input, to thereby cause rotation of the steering shaft via the torsion bar and inertia wheel through a calibrated range of steering angles;
   measuring a displacement of the rack from a center position via a linear actuator;
   applying an axial force to the rack that is proportional to the measured displacement and in a direction resisting motion of the rack while transmitting the periodic steering control signal;
   measuring a steering torque output value along the steering shaft via a torque transducer while transmitting the periodic steering control signal and applying the axial force; and
   executing a control action with respect to the steering system, via the controller, when a difference between a maximum value of the measured steering torque and a minimum value of the measured steering torque occurring after the maximum value of the steering torque, at start-up and at each reversal of direction of the periodic steering control signal, exceeds a calibrated threshold value indicative of the stick-slip condition.

2. The method of claim 1, wherein transmitting the periodic steering control signal includes transmitting a sinusoidal steering control signal.

3. The method of claim 1, wherein the linear actuator includes a linear variable differential transformer (LVDT), the method further comprising controlling the applied axial force via the LVDT to thereby allow the linear actuator to act as a constant-rate spring.

4. The method of claim 1, wherein executing a control action includes recording a diagnostic code in memory of the controller.

5. The method of claim 4, wherein executing a control action includes rejecting the steering system in a design validation process when the diagnostic code is recorded.

6. The method of claim 1, wherein the calibrated threshold value indicative of the stick-slip condition is 0.3 Nm.

7. A system comprising:
   a rotary actuator;
   an electrically-assisted steering system having a steering shaft, a rack having a rack axis, a pinion gear disposed on an end of the steering shaft in meshed engagement with the rack, a steering motor, and a drive mechanism that electrically assists a steering input into the steering system via the steering motor;
   a torque transducer operable for measuring a steering output torque along a steering axis of the steering shaft;
   a torsion bar connected to the rotary actuator via the torque transducer;

an inertia wheel connected to the torsion bar and to the steering shaft;

a linear actuator operable for providing a calibrated axial apply force along the rack axis; and a controller programmed to characterize a stick-slip condition of the steering system, wherein execution of instructions by the controller while the steering motor and the drive mechanism assist the steering input causes the controller to:

transmit a periodic steering control signal from a controller to the rotary actuator to thereby cause rotation of the steering shaft, via the torsion bar and inertia wheel, through a calibrated range of steering angles;

measure a displacement of the rack from a center position via a the linear actuator;

apply an axial force to the rack that is proportional to the measured displacement and in a direction resisting motion of the rack while transmitting the periodic steering control signal;

measure a steering torque output value along the steering shaft via a torque transducer while transmitting the periodic steering control signal and applying the axial force; and execute a control action with respect to the steering system, via the controller, when a difference between a maximum value of the measured steering torque and a minimum value of the measured steering torque occurring after the maximum value of the steering torque, for start-up and each reversal of the periodic steering control signal, exceeds a calibrated threshold value indicative of the stick-slip condition.

8. The system of claim 7, wherein the controller is programmed to transmit the periodic steering control signal as a sinusoidal steering control signal.

9. The system of claim 7, wherein the linear actuator includes a linear variable differential transformer (LVDT) operable for controlling the applied axial force via the LVDT to thereby allow the linear actuator to act as a constant-rate spring.

10. The system of claim 7, wherein the control action includes recording a diagnostic code in memory of the controller.

11. The system of claim 10, wherein the control action includes rejecting the steering system in a design validation process when the diagnostic code is recorded.

12. The system of claim 7, wherein the calibrated threshold value indicative of the stick-slip condition is 0.3 Nm.

* * * * *